July 26, 1966   T. E. G. GARDINER ETAL   3,262,264
JET PROPULSION POWER PLANT
Filed Aug. 29, 1963   7 Sheets-Sheet 1

Fig.1.

Inventor
TERENCE EDWARD GOUVENOT GARDINER
JOHN RODNEY DYSON FULLER
DANIEL EDWARD O'NEILL
PHILIP WILLIAM DAVIS
By
Bailey, Stephens and Huettig
Attorneys

United States Patent Office 3,262,264
Patented July 26, 1966

3,262,264
JET PROPULSION POWER PLANT
Terence Edward Gouvenôt Gardiner, John Rodney Dyson Fuller, Daniel Edward O'Neill, and Philip William Davis, all of Bristol, England, assignors to Bristol Siddeley Engines Limited, Bristol, England, a British company
Filed Aug. 29, 1963, Ser. No. 341,820
Claims priority, application Great Britain, Sept. 3, 1962, 33,704/62
6 Claims. (Cl. 60—35.6)

This invention relates to gaseous jet propulsion nozzles of the axially-displaceable centrebody type i.e. of the type in which a centrebody lies within the outer wall of the nozzle and is of such shape that the effective cross-sectional area of the nozzle outlet may be varied by axial displacement of the centrebody. The nozzle may discharge the propulsive flow either directly to the atmosphere or into a final nozzle which discharges directly to atmosphere.

When the centrebody has to be displaced against the gas flow, considerable force may be required to overcome the aerodynamic loading imposed by the flow. In aircraft power plant, weight and space limitations are important and thus the operating mechanism for the centrebody must provide the required power with due regard for these limitations.

According to this invention a jet propulsion power plant comprises a nozzle for the discharge of gas and a centrebody situated within the nozzle, in which the centrebody is arranged to be axially displaced by means of a double-acting ram assembly operated by air under pressure derived from the engine, the ram assembly including a movable cylinder which constitutes a stem for the centrebody.

Preferably, the movable cylinder is formed with a number of axially spaced walls, at least two of which are acted upon by the air under pressure during operation of the ram assembly for movement of the cylinder in either direction.

The ram assembly is simple and reliable, and the use of air under pressure as the source of operating power is attended with the minimum of risks. Preferably the air is drawn from the highest pressure available, and the ram is arranged to operate always against the highest possible back pressure, so as to locate the centrebody as nearly positively as is possible.

In a preferred arrangement, the ram assembly also includes a fixed piston with internal ducting which extends axially within the cylinder, the piston including axially-spaced outward-extending walls which make slidable sealing contact with the cylinder, and the cylinder including inward-extending walls which make slidable sealing contact with the piston and which are spaced axially alternately with the outward-extending walls of the piston so as to form a number of operating chambers, the internal ducting of the piston including a port for the supply and a port for the withdrawal of operating air to and from each operating chamber.

The ram assembly includes an operating chamber defined at its downstream end and by a conical end section of the movable cylinder, to which end section the centrebody is secured, and at its upstream end by an adjacent outward-extending wall of the piston.

The ram assembly may be mounted by bearings within the support tube mounted in fixed relation to the walls defining the nozzle, the centrebody being arranged to overlap with radial clearance the downstream end portion of the support tube.

In a preferred arrangement including a gas turbine engine the movable cylinder is mounted on bearings within a fixed support tube having a flanged upstream end portion which supports a bearing for the adjacent end of the fixed piston of the ram assembly and is secured to the turbine exhaust cone of the gas turbine engine.

The outer surface of the ram cylinder may be provided with helical splines which engage bearing elements mounted on the inner surfaces of the support tube, the arrangement being such that axial displacement of the centrebody and its stem causes it to be rotated. By these means the effect of possible hot spots on the centrebody may be mitigated.

A preferred method of operating the double-acting ram assembly comprises the steps of supplying compressed air to both sides of the ram assembly, and then reducing the pressure on one side only of the ram assembly, so as to cause the centrebody to be displaced in the required direction.

By way of example one embodiment of the invention will now be described with reference to the annexed drawings in which.

Figure 1:
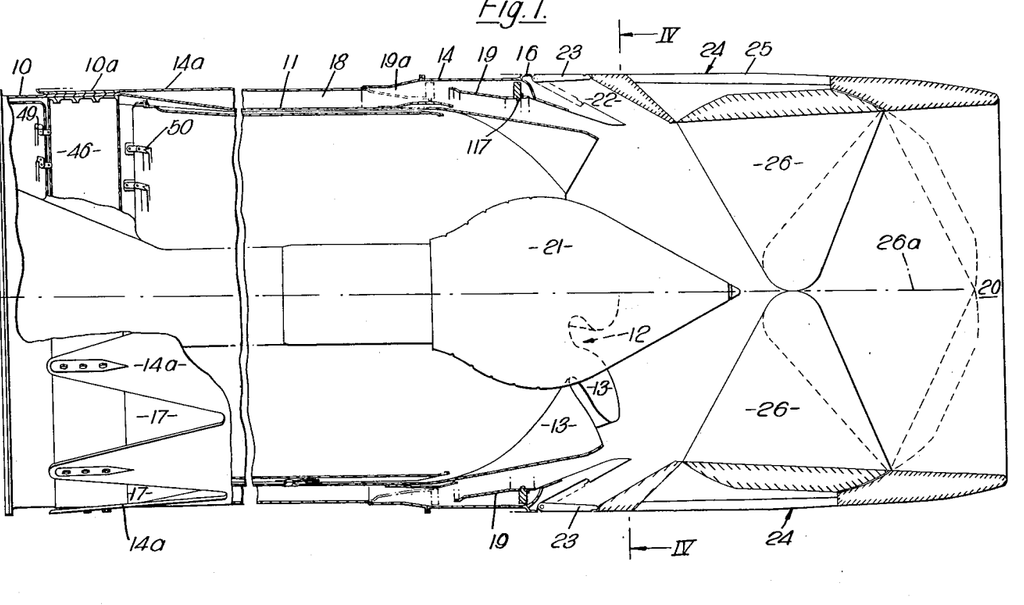
FIGURE 1 is a diagrammatic part-sectional side elevation of a convergent-divergent nozzle system for a supersonic aircraft wherein a centrebody is provided within a convergent primary nozzle of corrugated shape.
Figure 4:
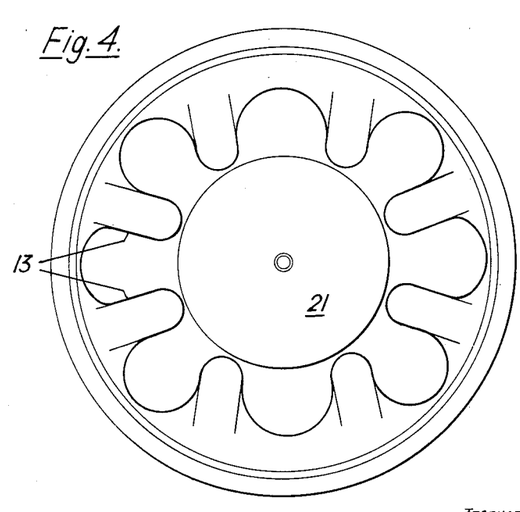
FIGURE 4 is a section along the line IV—IV in FIGURE 1 showing the centrebody within the corrugated primary nozzle.

Referring to FIGURES 1 and 4, a gas turbine engine comprising low pressure and high pressure compressors, a combustor, and high and low pressure turbines is enclosed in an engine casing, the flanged final section of which is indicated at 10. The adjacent casing 10a is continued downstream by an extension 11 until it finally terminates in a nozzle 12 formed with corrugations 13 of rearwardly increasing radial penetration to achieve a reduction in the noise of the issuing jet. This nozzle 12 constitutes the convergent primary nozzle of a convergent-divergent nozzle system. An outer casing 14, which is secured at its upstream end 14a to the section 10, extends downstream until it meets the outer skin 16 of the aircraft wing, at which location the casing 14 turns sharply inwards to finish just short of the outlet of the primary nozzle. At its upstream end 14a the outer casing 14 is serrated to form a circumferential series of openings 17 for secondary air taken from the boundary layer which forms on the underside of the wing upstream of a variable-geometry engine air intake—not shown—and also from bleed porting taking boundary layer air from compression surfaces in the air intake. After entering the openings 17, the secondary air normally flows along the annulus 18 defined by the casings 11, 14, to be finally directed with a radially inward component into the corrugations 13 of the primary nozzle whence it mixes downstream with the exhaust gas effluent from that nozzle. The flow of secondary air through the annulus 18 is controlled by an axially movable frusto-conical valve 19, the upstream or closed position of which is indicated by broken lines 19a.

The primary nozzle 12 discharges into a final or downstream nozzle 20 of fixed divergence and substantially oblong cross-section, which normally discharges the mixed flow of exhaust gas and air rearwards to atmosphere. The effective area of the primary nozzle 12 is controlled by the displacement along the nozzle axis of a centrebody 21 of pear-shape, the limits of such displacement being indicated in FIGURES 2 and 2A above and below the centre line. Between the primary and final nozzles, a circumferentially spaced series of inward-inclined ducts 22 is provided for the admission of tertiary air, taken from boundary layers adjacent to the engine nacelle, into the upstream end of the final nozzle, the flow through these ducts 22 being controlled by pivotable valves 23. This tertiary air supplements the secondary air during subsonic flight to prevent over-expansion of the gas flow in the final nozzle, and thus to reduce drag. In trans-sonic flight with reheat, and in supersonic flight, the flow of tertiary air is stopped. The control of the tertiary air in fact changes the effective divergence of the fixed final nozzle 20.

The final nozzle 20 is provided intermediate of its length with upper and lower discharge openings 24 across which extend grids of deflector vanes 25. The openings 24 are normally masked by the intermediate portions of two channel-section deflector members 26 in their inoperative positions. For thrust reversal, the members 26 are pivoted rearwards and inwards so as to unmask the openings 24 and to abut one another on the horizontal plane 26a containing the nozzle axis. In this position, the members 26 deflect the flow in the final nozzle outwards through the openings 24, the grids 25 serving to discharge the deflected gas to atmosphere with a forward component of velocity for braking purposes.

Figure 2:
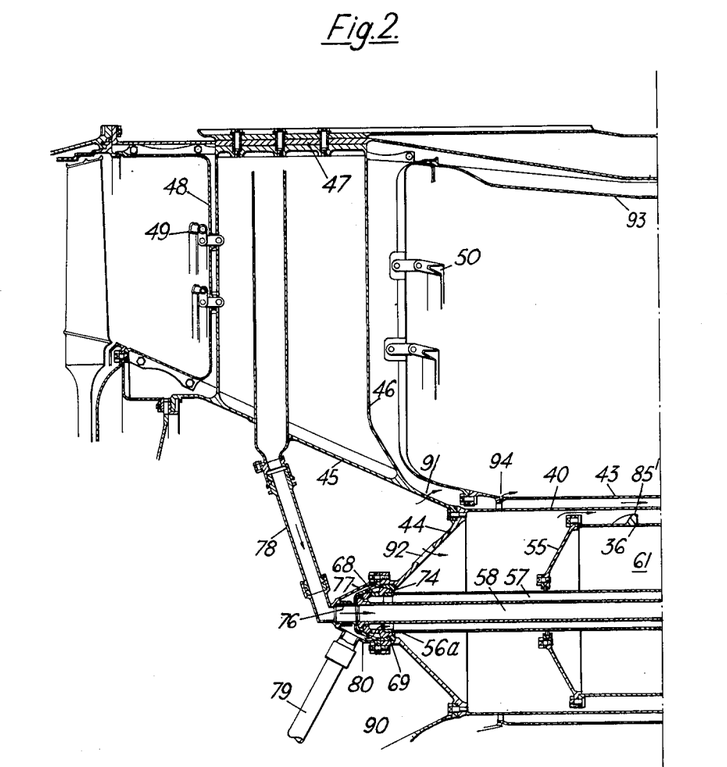
FIGURES 2 and 2A, which are of larger scale, illustrate in sectional side elevation the centrebody and ram assembly in two extreme positions.
Figure 2A:
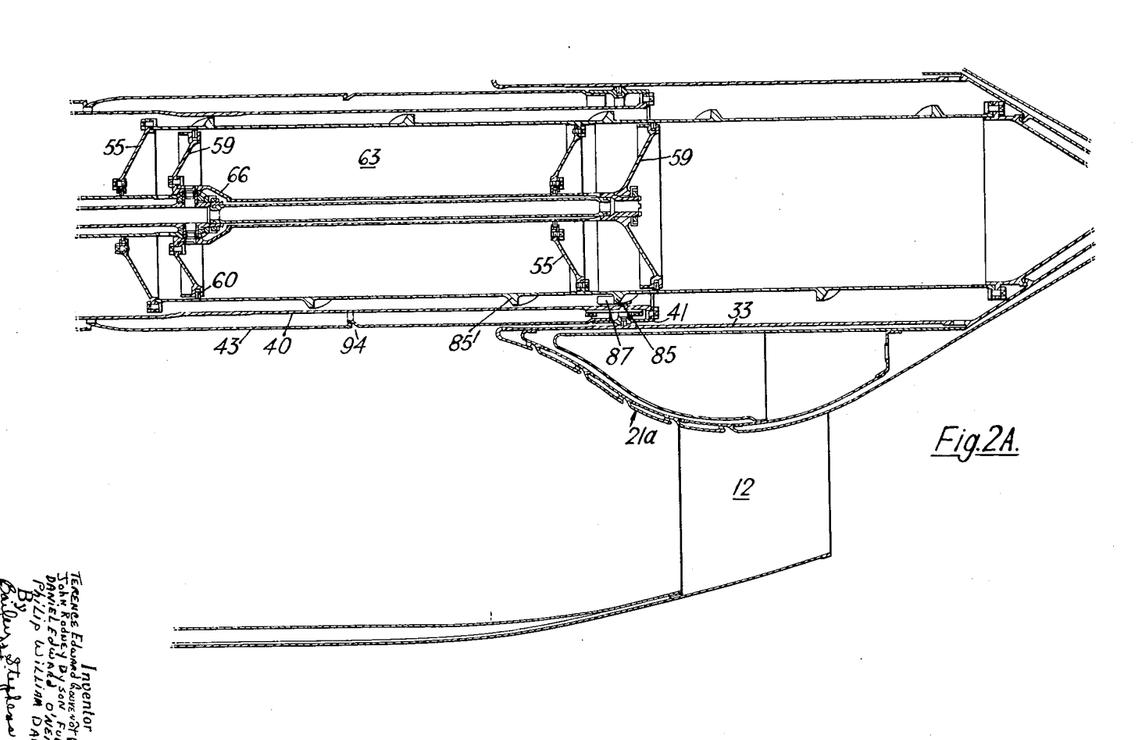

Referring more particularly to FIGURES 2 and 2A, the centrebody 21 which lies within the primary nozzle 12 is shown in FIGURE 2 above the centre line in its extreme upstream position, and in FIGURE 2A below the centre line in its extreme downstream position 21a. The centrebody, which is of pear shape, has a curved upstream portion 27 leading to an equatorial portion 30, and a frusto-conical downstream portion 31. The areas and shape of these portions 27, 31 are chosen so that the resultant loading from the opposing aerodynamic loads thereon arising from the flow of exhaust gas urges the centrebody in the downstream sense. This loading increases with rearward displacement of the centrebody.

The centrebody has an outer skin 32 and an inner skin 33. At the rear end, both skins are conical, and they are mounted on a boss 35 and held in place by a cap nut 34. This boss 35 is an extension of a conical end section 39 of the ram cylinder 36, which constitutes the stem of the centrebody. The remainder of the stem 36 is cylindrical, and the inner skin 33 has a cylindrical upstream part 33a which surrounds the stem. Between the stem 36 and the inner skin 33a are a support tube 40 and a heat shield 43. The inner skin 33a has a cylindrical spigot 37 which fits into a cylindrical spigot 38 on the end section 39 of the stem. The spigot 38 and the boss 35 constitute the entire means for supporting and aligning the centrebody. On release of the cap nut 34, the centrebody can be removed.

The support tube 40 terminates upstream in a frusto-conical flanged end section 44 which is bolted to a flange on a turbine tailcone 45 welded to the radially inner ends of a set of hollow radial support vanes 46 which extend across the annular gas flow passage to be bolted at their outer ends to a reinforcement ring 47 welded to the upstream end of the casing 11 carrying the nozzle 12. The vanes 46 are enclosed in fairings 48, the radially inner ends of which are flanged and bolted to the flanged upstream end of the heat shield 43. The upstream ends of the fairings 48 carry fuel spray rings 49 for a reheat combustion system whilst the downstream ends carry flame-stabilising gutters 50.

The centrebody stem 36 constitutes the movable cylinder of a pneumatically-operated ram assembly for controlling the position of the centrebody and has two inward-extending walls 55, made of frusto-conical shape for strength. The ram piston rod, which is fixed, takes the form of a double tubular member 56 containing outer and inner concentric air ducts 57, 58, and has two outward-extending walls 59, also of frusto-conical shape. Sealing elements 60 are mounted in the free edges of the end walls 55, 59. The ram cylinder 36, the piston rod 56, and their respective end walls together define operating chambers 61, 62 and 63 for the ram assembly, whilst a fourth chamber 64 is defined by the downstream outward-extending end wall 59 and the frusto-conical end section 39 of the centrebody stem.

The ram piston rod 56 consists of two co-axial sections having enlarged end portions 65, 66 with mating part-spherical surfaces which are articulated together by hollow radial dowels 67. The ram outer duct 57 is formed with lateral ports 68 in an upstream end fitting 69 and with lateral ports 70 and 72 in its outer wall. The ram inner duct 58, which is open at both ends, is formed with lateral ports 73 in alignment with the hollow dowels 67, which act as air transfer ducts. The upstream end 56a of the piston rod 56 is seated in a split collet 74 held in an inner flange 75 of the end section 44 of the support tube 40. Bolted to this flange are two pipe connections 76, 77 serving to connect an air supply pipe 78 to the ram inner duct 58 and to connect a second air supply pipe 79 through porting 80 to the ram outer duct 57. For downstream displacement of the ram cylinder and therefore the centrebody, air under high pressure is supplied to the inner ram duct 58 through the pipe 78, whilst for upstream displacement air under high pressure is supplied to the outer ram duct 57 through the pipe 79.

Figure 3:
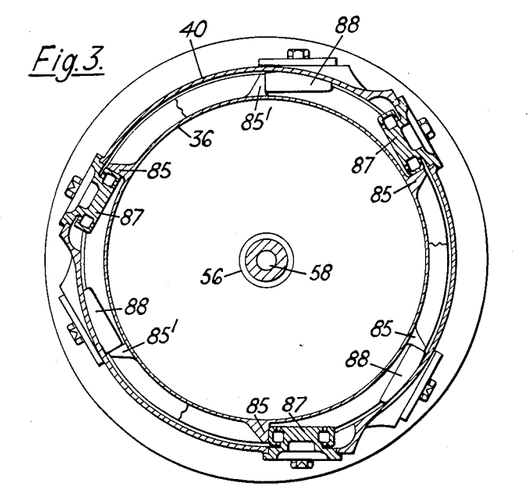
FIGURE 3 is a section along the line III—III in FIGURE 2 showing a bearing arrangement for rotatably mounting the stem of the centrebody within a support tube.

Referring also to FIGURE 3, the ram cylinder 36 is supported within the support tube 40 in such a manner as to cause a slow rotation of the cylinder whenever it is displaced axially, in order to mitigate the effect of any hot spots on the centrebody, resulting for example from uneven burning in the reheat system. To this end, the outer surface of the cylinder is provided with helical splines 85, 85' which lie clear of the support tube 40 but are engaged by rollers 87, 88.

The complete location of the stem is effected by two axially spaced sets of three roller bearings mounted on the support tube, namely a rear set of roller bearings 87 and a front set of roller bearings 88, cooperating with anti-clockwise-facing splines 85 extending over a rear end portion of the cylinder 36 and clockwise-facing splines 85' extending over a front end portion of the cylinder 36 respectively. The axes of the bearings are parallel to, but offset from, radii of the stem, so that the running face of each spline is radial. This permits radial thermal expansion without binding.

The centrebody and other parts require to be cooled. Accordingly, air is tapped from a suitable source, such as an early stage of the HP compressor, and conveyed across the gas passage within one of the hollow vanes 46 to enter the space 90 upstream of the ram piston rod 56, whence it divides, part passing outwards through holes 91 in the wall of the tailcone 45, and the remainder passing rearwards through larger holes 92 in the support tube end section 44. The outward flow of coolant air in turn divides, part flowing radially outwards between the load-carrying vanes 46 and their fairings 48 to reach the outer wall of the primary nozzle where it turns rearwards to flow along the outer surface of a combustion liner 93, holes (not shown) being provided at intervals in the liner to permit the coolant to pass through into the stream of exhaust gas. The other part of the coolant which passes through the holes 91 flows immediately rearwards, axially-spaced nozzles 94 being formed in the heat shield 43 for rearward discharge of the coolant in the form of a protective film. The rear end of the space between the heat shield and the support tube is closed by a ring 41, which supports the heat shield, and which carries a circumferential seal 42 slidingly engaging the inner skin of the centrebody.

That portion of the coolant which passes through the holes 92 flows rearwards between the ram cylinder 36 and its support tube 40, cooling the bearings 88, 87 on the way, until it reaches the centrebody inner skin 33. Here it is reversed in direction, passing through holes 95 to flow firstly forwards between the inner skin 33 and a lining 96 for the centrebody. At the front part 21a of the centrebody, the inner skin 33 meets the outer skin 32 which, over the front part 21a of the centrebody, is covered externally by a series of rings 99, which are fixed to the outer skin 32 at their leading edges 98. The lining 96 joins a lining 96' for the outer skin. The coolant enters the space between the outer skin and the lining 96', passes outwards through outlets 97, along the spaces between the rings 99 and the outer skin 32, and finally escapes into the gas stream between spacers 100 on each ring 99, which spacers define film cooling slots for the coolant discharge over the external curved surface of the centrebody. At the very front of the centrebody is a ring 104, having air outlet holes 105, and also slits beneath its rear edge. The remaining coolant flows aft between the lining 96' and the skin 32, and then between the skins 32, 33, to be discharged rearwards from the centrebody around the cap nut 34. Openings 101, 102 between the rear edges of the linings 96 and 96', and in a diaphragm 103 bracing the linings together, permit the interior of the centrebody to be filled with the pressurised coolant. The coolant pressure, which must be higher than the maximum gas pressure within the nozzle, exerts a rearward internal loading on the centrebody, which therefore acts in the downstream direction.

Figure 7:
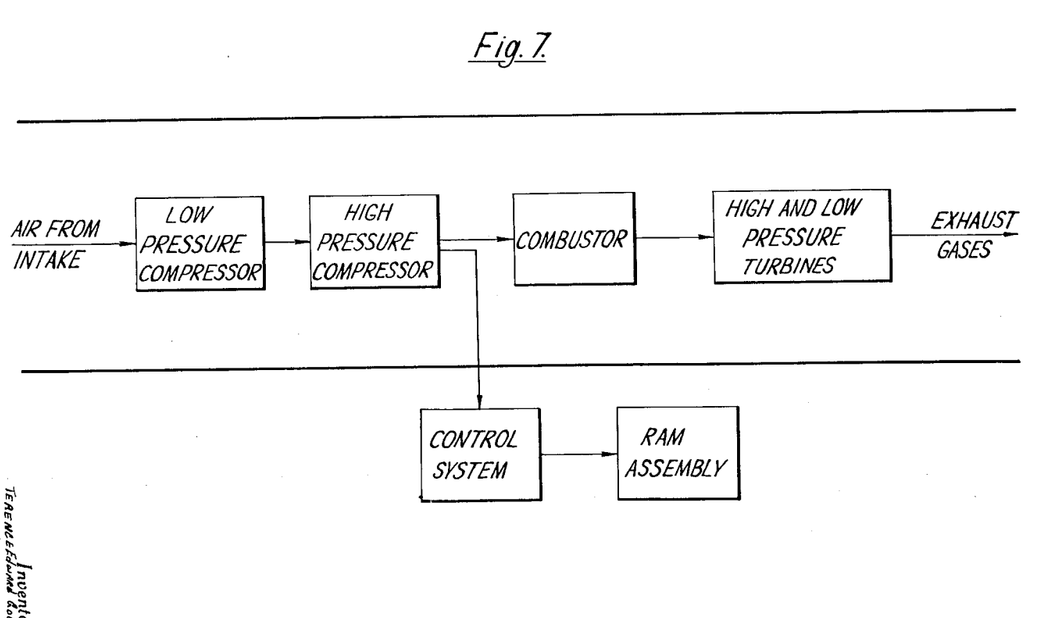
FIGURE 7 is a diagrammatic representation of a gas turbine power plant including a ram-operated centrebody.

To ensure a quick and certain response of the centrebody to its control system, and to obtain a high resistance to accidental centrebody displacement resulting from sudden fluctuations in aerodynamic loading, the highest air pressure available is used to operate the ram assembly, hence the air supply pipes 78, 79 are connected through a control system to the delivery of the HP compressor of the engine, as indicated diagrammatically in FIGURE 7.

The control system for the ram-operating air is not illustrated, but may comprise: a pressure ratio sensitive device which is responsive on the one hand to the gas pressure in the nozzle 12 and on the other hand to a predetermined proportion of the HP compressor delivery pressure; a servo piston, the opposing ends of which communicate with the HP compressor delivery; a vent valve for controlling the escape of air from either side of the servo piston, which valve is responsive to the movement of a member actuated by the pressure-ratio device; and a spool valve, mechanically connected to the servo piston, which controls the supply of HP compressor delivery air to the pipes 78, 79 and also the venting of such pipes to atmosphere. To stabilise the controlled displacement of the centrebody and to avoid hunting, two feed back devices are provided, one a mechanical device which is responsive to the displacement of the spool valve and the other a dashpot device which is responsive to the velocity of such displacement, both of which devices serve to return the pressure-ratio device to its neutral position.

In operation, when the ratio of compressor delivery pressure to nozzle gas pressure changes, the control system responds to cause the actuation of the ram assembly so as to move the centrebody to the correct position for the new operating condition in the nozzle. For upstream displacement of the centrebody from its extreme downstream position, a force in the upstream direction is needed, to overcome both the net aerodynamic loading on the centrebody and the loading exerted by the air coolant system. The full HP compressor delivery pressure is applied through the pipe 79 and the outer duct 57 to the operating chambers 61, 63 of the ram assembly, and, at the same time, the pressure in the chambers 62, 64 is reduced by the minimum required amount by venting the inner duct 58 and the pipe 78 to atmosphere. As the centrebody moves upstream, its net aerodynamic loading in the downstream sense decreases, so that air pressure in the chambers 62, 64 may be correspondingly raised.

For downstream displacement of the centrebody, when both the above-mentioned loadings are acting to assist the displacement, the air pressure applied to the chambers 61, 63 is maintained at the HP compressor delivery pressure, whilst the air pressure applied to the chambers 62, 64 is raised towards the HP compressor delivery pressure. Thus it will be seen that the maximum air pressure available from the engine is always applied to one side of the ram, the pressure on the opposing side being reduced when required but as little as possible. This promotes stability of the centrebody against any rapid fluctuations in aerodynamic loading and despite the change in aerodynamic loading with centrebody displacement. In effect, the air within the ram acts as if it were a spring, and the higher the average of the pressures in the various chambers the higher the rate of this notional spring and the greater the opposition to undesired movement of the centrebody.

If, however, it is desired to quicken a downstream displacement of the centrebody, the pressure acting in the chambers 61, 63 may be correspondingly reduced.

Should the supply of ram-operating air fail with the centrebody in an upstream position, the aerodynamic loading and the coolant loading (if available) will be sufficient to overcome the frictional resistance of the ram cylinder and will move the centrebody to its extreme downstream position, which would be the normal fail-safe position.

Figures 5, 6:
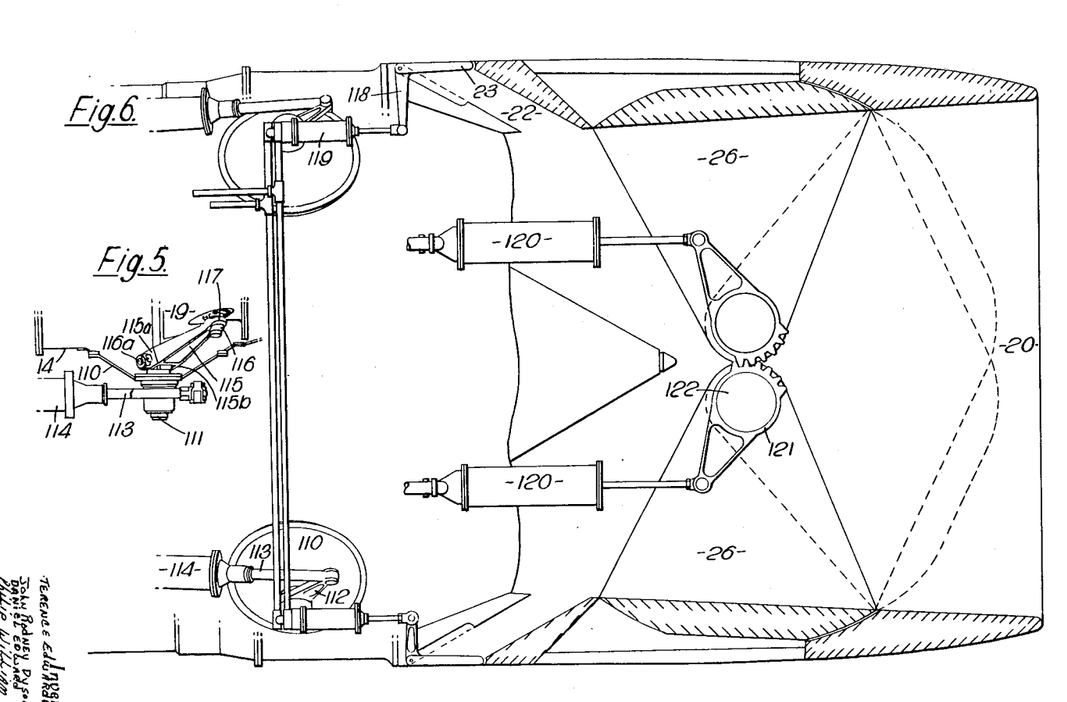
FIGURE 5 is a detailed view of a mechanism for operating a secondary air closure valve.
FIGURE 6 illustrates auxiliary ram-operated mechanisms for actuating tertiary air closure valves and flow-reversing members.

The actuating mechanism for the secondary air valve 19 is shown in FIGURES 5 and 6. The outer casing 14 supports externally pairs of hollow bosses 110 in which are mounted spindles 111, to the outer ends of which are secured rocker arms 112. Connecting rods 113 transmit the control movements of four double-acting air actuators 114 to the spindles 111. Operating links 115 having forked upstream ends 115a, 115b which are pin-jointed by a pin 116a to the inner ends of the spindles 111 are provided at their downstream ends with collars 117 which engage mounting trunnions 116 on the valve 19. To obstruct the air flow through the annulus 18, the connecting rods 113 are moved to cause the links 115 to pull the valve 19 upstream to the position shown in broken lines at 19a in FIGURE 1, in which position the valve 19 seals off the downstream end section of the annulus 18. Movement of the rods 113 in the reverse sense causes the valve to move downstream to its open position as shown in full lines in FIGURE 1.

The tertiary air valves 23 are pivotally mounted on a bulkhead and are moved between their open and closed positions by means of rocker arms 118 controlled by double-acting air actuators 119, as shown in FIGURE 6.

As also shown in FIGURE 6, the deflector members 26 are moved between their inoperative position, shown in full lines, and their thrust-reversal position, shown in broken lines, by means of two pairs of double-acting air actuators 120, the connecting rods of which are linked to two pairs of inter-engaging quadrants 121 secured to the stub shafts 122 of the deflectors 26.

The convergent-divergent nozzle assembly operates as follows. For take-off at maximum thrust without reheat, the centrebody is displaced almost to its extreme downstream position. Both the secondary and the tertiary air valves 19, 23 are open. During the climb-away at subsonic speed after take-off, the centrebody is moved upstream almost to its extreme upstream position to enlarge considerably the effective area of the nozzle 12, thus reducing the velocity of the gas stream and hence the jet noise.

For transonic acceleration using reheat, the centrebody is moved to its extreme upstream position to provide the maximum effective area of the nozzle 12. The secondary air valves 19 remain open but the tertiary air valves are shut. For cruise at supersonic speed without reheat, the centrebody is moved towards its extreme downstream position.

For stand-off prior to joining the landing circuit, the centrebody is moved towards its extreme upstream position and the tertiary air valves are opened. Finally, after touch-down, when braking thrust is required, the deflector members 26 are moved to their thrust-reversal position, the centrebody is moved almost to its extreme downstream position, and the secondary air valve 19 is shut.

We claim:
1. A jet propulsion power plant including means for producing a source of compressed air, walls defining a nozzle, a centre body lying within the walls defining the nozzle and defining a nozzle outlet therewith, and means for moving the centre body axially in relation to the walls defining the nozzle between an upstream and a downstream position in order to vary the effective cross-sectional area of the nozzle outlet, said means comprising a double-acting ram assembly operated by compressed air and means for leading compressed air from the source of compressed air to the ram assembly, said ram assembly including a movable cylinder which constitutes a stem for the centre body and which is formed with a number of axially spaced walls at least two of which are acted upon by the compressed air during operation of the ram assembly for movement of the cylinder in either direction, a support tube mounted in fixed relation to the walls defining the nozzle and having the downstream end portion surrounded and overlapped with radial clearance by the centre body, and at least two sets of axially spaced bearings on which the movable cylinder is mounted within the support tube, the centre of gravity of the centre body at least in its upstream position lying axially between said sets of bearings.

2. A power plant according to claim 1 in which the ram assembly includes a fixed piston with internal ducting which extends axially within the cylinder, the piston including axially-spaced outward-extending walls which make slidable sealing contact with the cylinder, and the cylinder including inward-extending walls which make slidable sealing contact with the piston and which are spaced axially alternately with the outward-extending walls of the piston so as to form a number of operating chambers, the internal ducting of the piston including a port for the supply and a port for the withdrawal of operating air to and from each operating chamber.

3. A power plant according to claim 2, in which the downstream operating chamber is defined at its downstream end by a conical end section of the movable cylinder, to which end section the centrebody is secured, and at its upstream end by an adjacent outward-extending wall of the piston.

4. A power plant according to claim 2, including a gas turbine engine, having a turbine exhaust cone in which the fixed support tube has a flanged upstream end portion which supports a bearing for the adjacent end of the fixed piston of the ram assembly and is secured to the turbine exhaust cone of the gas turbine engine.

5. A power plant according to claim 1, in which helical splines on the outer surface of the movable cylinder of the ram assembly engage with bearing elements mounted on the inner surface of the support tube, the arrangemenet being such that axial displacement of the centrebody and its stem causes it to be rotated.

6. A method of operating an axially-displaceable centrebody lying within the outlet nozzle of a jet propulsion power plant, in order to vary the effective cross-sectional area of the nozzle outlet, comprising the steps of supplying compressed air to both sides of a ram assembly, including a movable cylinder connected to the centrebody and then reducing the pressure on one side only of the ram assembly, so as to cause the movable cylinder and centrebody to be displaced in the required direction and rotating the movable cylinder and centrebody about the axis of the cylinder during such axial displacement in either direction.

References Cited by the Examiner
UNITED STATES PATENTS

| 2,402,363 | 6/1946 | Bradbury | 60—35.6 |
| 2,971,327 | 2/1961 | Moy | 60—35.6 |

MARK M. NEWMAN, *Primary Examiner.*

RALPH D. BLAKESLEE, *Examiner.*